United States Patent [19]

Park

[11] Patent Number: 4,975,778
[45] Date of Patent: Dec. 4, 1990

[54] IMAGE PICK-UP APPARATUS INCLUDING VOLTAGE CONTROLLED AUTOMATIC IRIS CONTROL

[75] Inventor: Oh-yeon Park, Suwon, Rep. of Korea

[73] Assignee: Samsung Electron Devices Co., Ltd., Kyunggi, Rep. of Korea

[21] Appl. No.: 430,727

[22] Filed: Nov. 2, 1989

[30] Foreign Application Priority Data

Nov. 3, 1988 [KR] Rep. of Korea ............... 88-14454

[51] Int. Cl.$^5$ .............................. H04N 5/238
[52] U.S. Cl. .................. 358/228; 358/213.19; 358/209
[58] Field of Search ............ 358/209, 228, 213, 13, 358/213, 19

[56] References Cited

U.S. PATENT DOCUMENTS

| | | | |
|---|---|---|---|
| 4,516,172 | 5/1985 | Miyata et al. | 358/228 |
| 4,581,648 | 4/1986 | Ganther | 358/209 |
| 4,597,014 | 6/1986 | Suzuki | 358/228 |
| 4,819,074 | 4/1989 | Suzuki | 358/209 |
| 4,833,536 | 5/1989 | Okino et al. | 358/209 |
| 4,868,667 | 9/1989 | Tani et al. | 358/228 |

*Primary Examiner*—James J. Groody
*Assistant Examiner*—Wendy R. Clements
*Attorney, Agent, or Firm*—Colucci & Umans

[57] ABSTRACT

An image pick-up apparatus comprises: an optical system for optically controlling incident light rays; an image pick-up device for converting the light rays to signal charges; a drive pulse generating circuit for outputting driving pulses in order to drive the image pick-up device; and a signal level detecting circuit. A voltage-controlled signal generating circuit is provided for maintaining the levels of the output signals of the image pick-up device at a constant level by controlling the driving pulses outputted from the drive pulse generating circuit in accordance with the levels of the output signals of the image pick-up device. According to the apparatus of the present invention, the structure becomes simple, miniaturization becomes possible, response speed becomes fast, and power consumption becomes negligible compared the conventional apparatus.

4 Claims, 2 Drawing Sheets

IMAGE PICK-UP APPARATUS INCLUDING VOLTAGE CONTROLLED AUTOMATIC IRIS CONTROL

FIELD OF THE INVENTION

The present invention relates to an image pick-up apparatus, and particularly to one utilizing a solid image pick-up device.

BACKGROUND OF THE INVENTION

The solid state image pick-up device used as an image pick-up device for portable video cameras, electronic still cameras and image inputting devices is smaller and lighter compared with the conventional iconoscope, and therefore, its field of application is being gradually expanded, because the apparatuses adopting the solid state image pick-up device can be miniaturized.

A CCD (charge coupled device) is one such solid state image pick-up device. In this type of device, the photo-accumulation effect of the CCD is utilized. The constitution of this device is schematically illustrated in FIG. 1.

The illustrated image pick-up device 1 is constituted such that photo converting sections 7 consisting of photo diodes and photo transistors are arranged on a board in rows and columns and in the pattern of (400-500)×(250-300). The device also includes vertical transfer sections 8 for vertically transferring charges generated through the conversion of light rays received by the photo converting sections 7, from these sections to horizontal transfer sections 9. Sections 9 output these charges in the form of output signals 10 or drain charges 11 after receipt thereof from the vertical transfer sections 8.

The vertical transfer sections 8 and the horizontal transfer sections 9 respectively consist of the CCD devices, and are also provided on their surfaces with a plurality of transmission electrodes which are for transmitting the charges in accordance with driving pulses supplied from a driving pulse generating circuit (to be described later).

A video camera adopting such an image pick-up device 1 is illustrated in FIG. 2.

This video camera comprises: an optical system 3 consisting of lenses and prisms for focusing and lenses and prisms or a mirror for spectroscopically breaking down incident light rays 2; an image pick-up device, e.g., the CCD type solid state image pick-up device as illustrated in FIG. 1, for converting the light rays into output signals after receipt of the light rays which have been controlled by the optical system, and for supplying the output signals to a video circuit (not shown); and a driving pulse generating circuit 16 for driving the image pick-up device 1 in the required periods.

In the case of video cameras, an image quantity equivalent to about 60 frames per minute, is required and therefore, the image pick-up device 1 will have a field period of 1/60 seconds. If a clear image is to be obtained when picking up a speedy object, only the signal charges accumulated during one field period, i.e., during 1/250-1/2000 seconds are outputted, while the signal charges accumulated during the periods other than the above mentioned period become needless and have to be drained away in the form of drain signals. This signal charge accumulation time can be compared to the shutter period of a camera.

Meanwhile, the solid state image pick-up device, e.g., the CCD, is very sensitive to the amount of the incident light rays, and therefore, the resolving power becomes insufficient upon encountering the case of an insufficient amount of light rays, while it produces the so-called blooming phenomenon upon encountering the case of an excessive amount of light rays, thereby degrading the image quality. Therefore, the need arises for properly adjusting the amount of light rays incoming into the image pick-up device.

The conventional image pick-up apparatus is of the "fixed shutter time" type, in which the amount of incident light rays 2 incoming through an iris mechanism into the image pick-up device 1 is adjusted in a state with the above described signal charge accumulating time, i.e., a fixed shutter time.

That is, according to the conventional image pick-up apparatus as shown in FIG. 2, a part of the output signals from the image pick-up device 1 is received in a signal level detecting circuit 14 for detecting the level of the signals, and an auto iris circuit 15 which controls an iris driving section 17 consisting of a motor or a solenoid in such a manner that the average level of the output signals should be always constant. In turn, the iris driving section 17 drives an iris mechanism 18 in such a manner that the amount of incident light rays incoming into the image pick-up device 1, is adjusted.

The light amount adjusting means used in such a conventional image pick-up apparatus is constituted such that a mechanical type iris adjusting mechanism is used in a state with the shutter time is fixed, and therefore, its constitution is very complicated, thereby raising the manufacturing cost, and making miniaturization difficult. Further, in the case where the object is moving at a high speed, the response speed becomes very slow, while if the brightness of the object is too high or too low, its discrimination is almost impossible.

Further, this mechanical light amount adjusting means consumes large amounts of power, and therefore, portable video cameras or electronic still cameras using batteries as the power source have difficulties because of the speedy depletion of the battery source.

SUMMARY OF THE INVENTION

The present invention is intended to overcome the disadvantages of the conventional image pick-up apparatus.

Therefore it is the object of the present invention to provide an image pick-up apparatus provided with a light amount adjusting means which is simple in its structure, fast in its response speed, and low in its power consumption.

In order to accomplish the above object, the image pick-up apparatus according to the present invention comprises: an optical system for optically controlling the incident light rays; an image pick-up device for converting the light rays received through the optical system to signal charges, and for outputting the signal charges; a drive pulse generating circuit for outputting driving pulses in order to drive the image pick-up device; and a signal level detecting circuit for detecting the levels of the output signals from the image pick-up device, characterized in that a voltage-controlled signal generating circuit is provided for maintaining the levels of the output signals of the image pick-up device at a constant level by controlling the driving pulses outputted from the drive pulse generating circuit in accordance with the levels of the output signals of the image pick-up device. The levels of the output signals are indicative of those detected by the signal level detecting circuit.

BRIEF DESCRIPTION OF THE DRAWINGS

The above object and other advantages of the present invention will become more apparent by describing in detail the preferred embodiment of the present invention will reference to the attached drawings in which.

DESCRIPTION OF THE PREFERRED EMBODIMENT

Figure 3:
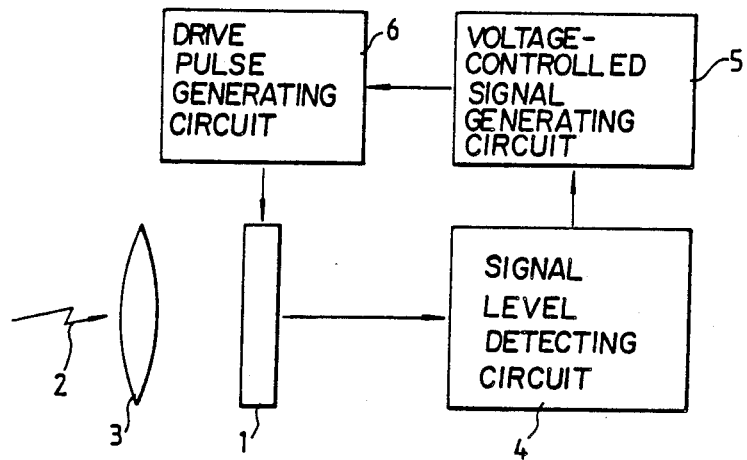
FIG. 3 schematically illustrates the image pick-up device according to the present invention.

As shown in FIG. 3, the image pick-up apparatus, e.g., a video camera according to the present invention, comprises: an optical system 3 for focusing incident light rays 2, onto an image pick-up device 1, and depending on the requirements, for filtering and spectroscopically breaking down the incident light rays; an image pick-up device 1 for converting into signal charges the light rays controlled by the optical system 3, and for supplying the signal charges to a video circuit (not shown); a drive pulse generating circuit 6 for driving the image pick-up device 1 at the required periods; a signal level detecting circuit 4 for detecting the levels of the output signals of the image pick-up device 1 after receipt of the signals, and for outputting the corresponding voltages; and a voltage-controlled signal generating circuit 5 for controlling the driving pulses outputted from the drive pulse generating circuit 6 by outputting the signals of the corresponding frequency in accordance with the voltage level supplied from the signal level detecting circuit 4.

The optical system 3 consists of a group of focusing lenses, a mirror or a prism for spectroscopically breaking down the light rays, and a filter for filtering, in combination thereof.

Figure 1:
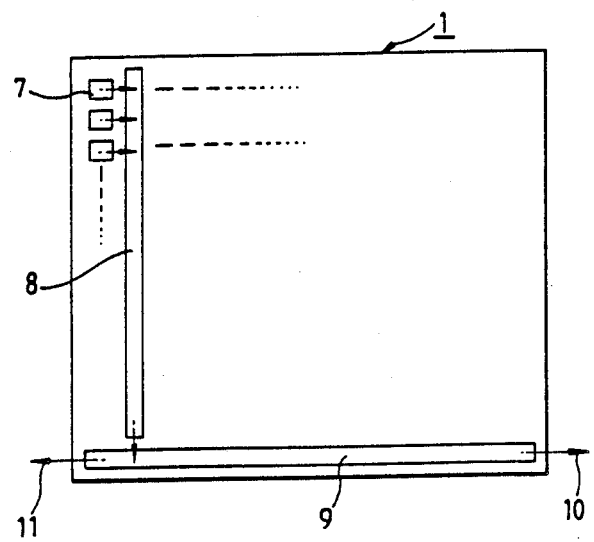
FIG. 1 is a schematic plan view of the ordinary image pick-up device.
Figure 2:
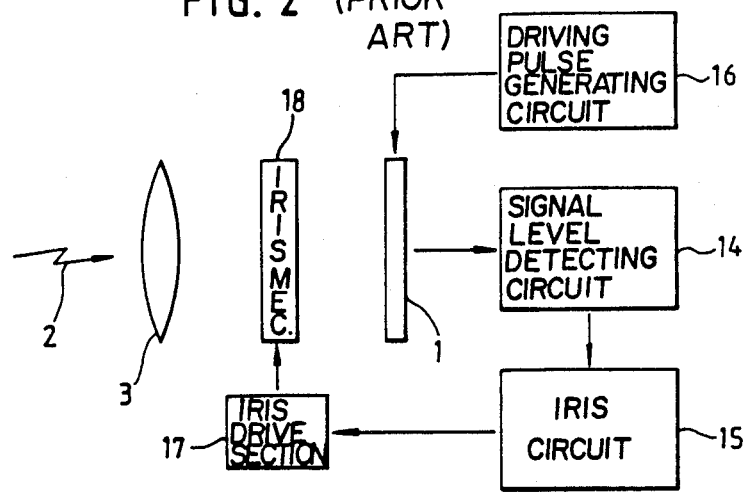
FIG. 2 schematically illustrates the system of the conventional image pick-up apparatus adopting the image pick-up device of FIG. 1.

The image pick-up device 1 may desirably be of the CCD type solid state image pick-up device shown in FIG. 1, and its type may be a frame type or an interline type, either one of which will not give any adverse effect to the present invention.

The image pick-up device 1 is provided at its top with transmission electrodes (not shown) which are properly arranged, and the drive pulse generating circuit 6 supplies vertical transmission pulses, horizontal transmission pulses and/or, depending on the requirements, reset pulses to the transmission electrodes, in such a manner that the transmissions and the transmission periods of the signal charges should be controlled thereby. Further, peripheral circuits such as a sampling circuit or an amplifying circuit can be provided therein.

The signal level detecting circuit 4 amplifies or converts the output signals of the image pick-up device 1 after receipt thereof, and outputs DC voltages having the levels corresponding thereto. The voltage-controlled signal generating circuit 5 may consist of a voltage-controlled oscillator or the like, which is capable of outputting output signals having a frequency corresponding to the inputted voltages.

The image pick-up apparatus constituted as above according to the present invention will now be described as to its operations.

Referring to FIG. 3, the incident light rays 2 are incoming into the image pick-up device 1 after having been controlled by the optical system 3, and then, converted into signal charges by the image pick-up device 1, thereafter, the signal charges being outputted to a video circuit (not shown) and to the signal level detecting circuit 4. The signal level detecting circuit 4 properly amplifies and/or converts the output signals of the image pick-up device 1 based on the requirements, and supplies the corresponding DC voltages to the voltage-controlled signal generating circuit 5. The voltage-controlled signal generating circuit 5 generates control signals having a frequency corresponding to the input voltage supplied from the signal level detecting circuit 4, and supplies these signals to the drive pulse generating circuit 6, so that these signals can control the outputted driving pulses by controlling the reference pulse of the drive pulse generating circuit 6.

In this way, the charge accumulating time of the image pick-up device 1 driven by the drive pulse generating circut 6, i.e., the shutter time, is varied so that the signal level of the charges outputted from the image pick-up device 1 in accordance with the amounts of the incident light rays should always be maintained at a constant level, thereby making a separate shutter means unnecessary.

Figure 4:
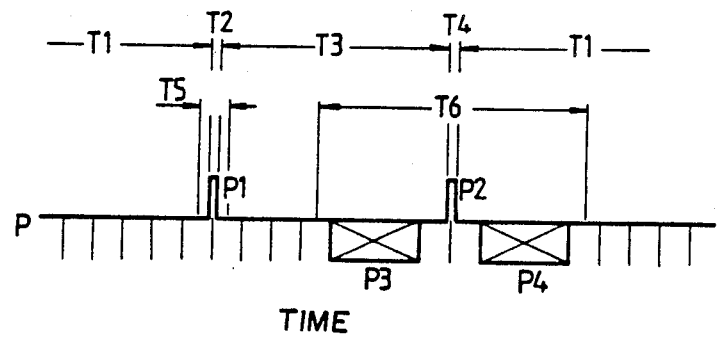
FIG. 4 is a timing chart showing the operations of the image pick-up apparatus according to the present invention.

The operation of the image pick-up apparatus according to the present invention, i.e., the function of the apparatus as an electronic shutter, will be further described in detail referring to FIGS. 1 and 4.

The incident light rays 2 introduced through the optical system 3 are converted into electric charges by the photo converting section 7 of the image pick-up device 1, and are supplied to the vertical transfer section 8. Then they are controlled by the vertical transfer pulse P supplied from the drive pulse generating circuit 6 so that the signal charges for the whole field for the period T1 are sequentially transmitted to the horizontal transfer section 9.

Then a high speed reverse transmission pulse P3 and a drain pulse P1 of the time segment T2 are supplied, so that the unnecessary signal charges are discharged in the form of drain charges 11, while a high speed transmission pulse P4 and a read-out pulse P2 of the time segment T4 are supplied so that the necessary charges are outputted in the form of output signals 10. Meanwhile, for the sake of stabilization of the screen images, the driving pulses P1-P4 are supplied during a horizontal blanking period T5 and a vertical blanking period T6 in which the transmissions of the signal charges are halted. Here, the high speed reverse transmission pulse P3 is a driving signal by which a transmission electrode (not shown) is capable of transferring the electric charges of the horizontal transfer section 9 to the left in the drawing, while the high speed transmission pulses P4 is a driving signal capable of transferring the electric charges to the right in the drawing.

Accordingly, the signal charges outputted in the form of the output signal 10 are the charges accumulated in the photo converting section 7 through the period T3, and therefore, the period T3 may be called the "signal charge accumulating time" or the "shutter time".

According to the image pick-up apparatus of the present invention, the interval between the read-out pulse P2 and the drain pulse P1, i.e., the signal charge accumulating time T3, is adjusted because the width of the reference pulse of the drive pulse generating circuit 6 is controlled by the signals outputted from the voltage-controlled signal generating circuit 5 in accordance with the amount of light, i.e., the level of the output signal 10 of the image pick-up device 1 as detected by the signal level detecting circuit 4, and that the driving pulse thus controlled is supplied from the drive pulse generating circuit 6. Therefore, even without a separate iris means, the signal 10 of the image pick-up device 1 should always maintain a constant level.

Thus the image pick-up apparatus according to the present invention does not require a separate mechanical iris means, with the result that the structure is simple, the manufacturing is easy, and miniaturization is possible. Further, the response speed is fast, the recognizability is excellent, and the power consumption is at a negligible level compared with the conventional apparatus, thereby making it possible to provide an image pick-up apparatus which is suitable as a portable video apparatus.

What is claimed is:

1. An image pick-up apparatus, comprising:
   a optical system for optically controlling incident light rays to produce controlled light rays;
   an image pick-up device for receiving the controlled light rays from the optical system and for converting the controlled light rays into signal charges, the image pick-up device including means for converting the signal charges into output signals having varying levels;
   a drive pulse generating circuit connected to the image pick-up device for generating driving pulses for applying the driving pulses to the image pick-up device to drive the image pick-up device;
   a signal level detecting circuit connected to the image pick-up device for detecting the levels of the output signals from the image pick-up device; and
   a voltage-controlled signal generating circuit connected between the signal level detecting circuit and the drive pulse generating circuit for maintaining the levels of the output signals from the image pick-up device at a constant level by controlling the drive pulses generated by the drive pulse generating circuit in accordance with the levels of the output signals detecting by the signal level detecting circuit.

2. An apparatus according to claim 1, wherein the image pick-up device comprises a charged coupled device.

3. An apparatus according to claim 1, wherein the voltage-controlled signal generating circuit includes means for generating control signals having a frequency which is proportional to the levels of the output signals detected by the level detecting circuit, the drive pulse generating circuit including means for generating driving pulses containing a reference pulse, the voltage-controlled signal generating circuit controlling the reference pulse according to the frequency of the control signals for producing output signals from the image pick-up device at a constant level.

4. An apparatus according to claim 3 wherein the image pick-up device comprises a charged coupled device.

* * * * *